United States Patent [15] 3,678,211
Hoogendorn et al. [45] July 18, 1972

[54] AIR BEARING MAGNETIC HEAD WITH GLASS SLIDER BODY

[72] Inventors: Helen M. Hoogendorn; Bernt Narken, both of Poughkeepsie, N.Y.; Paul J. Roeder, Carmel, Ind.; Brian Sunners, Poughkeepsie, N.Y.

[73] Assignee: International Business Machines Corporation, Armonk, N.Y.

[22] Filed: Aug. 18, 1969

[21] Appl. No.: 850,764

[52] U.S. Cl. .......... 179/100.2 P, 65/48
[51] Int. Cl. .......... G11b 5/60, G11b 5/10, G11b 5/42
[58] Field of Search .......... 179/100.2 P; 340/174.1 E; 65/48

[56] References Cited

UNITED STATES PATENTS

| | | | |
|---|---|---|---|
| 3,562,444 | 2/1971 | Hodgendoorn et al. | 29/603 |
| 2,969,435 | 1/1961 | Lynott | 179/100.2 P |
| 3,187,315 | 6/1965 | Cmeney | 340/174.1 E |
| 3,308,450 | 3/1967 | Bourdon et al. | 340/174.1 E |
| 3,528,067 | 9/1970 | Linsley et al. | 340/174.1 E |

OTHER PUBLICATIONS

Properties of Selected Commercial Glasses, Corning Glass Works, 1963, pg. 9–10

*Primary Examiner*—Bernard Konick
*Assistant Examiner*—Robert S. Tupper
*Attorney*—Fraser and Bogucki

[57] ABSTRACT

An air bearing slider assembly includes a U-shaped magnetic head and a monolithic glass body which is formed in the glassy state so as to chemically as well as physically bond the head thereto, a nonmagnetic gap in the base of the head being disposed at an air bearing surface of the glass body to facilitate noncontact magnetic recording. The slider assembly is fabricated using a mold having a central cavity which defines the desired configuration of the glass body and which positions the magnetic head at a selected location relative to the glass body to be formed. The mold cavity is filled with a fluid glass composition which solidifies as a monolithic body in bonded relation to the head.

6 Claims, 8 Drawing Figures

HELEN M. HOOGENDOORN
BERNT NARKEN
PAUL J. ROEDER
BRIAN SUNNERS
*INVENTORS*

BY *Fraser and Bogucki*

*ATTORNEYS*

HELEN M. HOOGENDOORN
BERNT NARKEN
PAUL J. ROEDER
BRIAN SUNNERS
*INVENTORS*

BY *Fraser and Bogucki*

ATTORNEYS

HELEN M. HOOGENDOORN
BERNT NARKEN
PAUL J. ROEDER
BRIAN SUNNERS
*INVENTORS*

BY Fraser and Bogucki

ATTORNEYS

AIR BEARING MAGNETIC HEAD WITH GLASS SLIDER BODY

BACKGROUND OF THE INVENTION

1. Field of the Invention

The present invention relates to magnetic head assemblies, and more particularly to air bearing slider assemblies used for noncontact recording in magnetic disk files and the like.

2. Description of the Prior Art

With ever increasing demands being placed on various magnetic recording systems due to increased density, signal frequency and the like, it has become necessary that equipment be used which adheres to relatively close tolerances and which minimizes the types of error producing variations commonly present in older and less sophisticated systems. In magnetic disk files, for example, factors such as data density may dictate the use of noncontact transducing in which the transducing elements are required to be kept very close to the recording surface of the record medium or disk. For such applications variations in the flying height of the transducing elements relative to the recording surface of the disk must be minimized in order to reduce variations in signal amplitude and resolution to a tolerable level.

One technique which provides for noncontact transducing within relatively close tolerances involves the mounting of a magnetic head in an air bearing slider that floats, by hydrodynamic action, over the rotating disk. The slider assembly is carried by an appropriate mounting arrangement such as that shown in a copending application, Ser. No. 722,007, filed Ap. 17, 1968, now U.S. Pat. No. 3,579,213, issued May 18, 1971, and assigned to the same assignee as the present application. Examples of air bearing slider assemblies are provided by copending applications, Ser. No. 750,227, filed Aug. 5, 1968, now U.S. Pat. No. 3,577,191, issued May 4, 1971, and Ser. No. 794,322, filed Jan. 27, 1969 now U.S. Pat. No. 3,610,837, issued Oct. 5, 1971, both of which are assigned to the same assignee as the present application.

In the slider assembly of application, Ser. No. 750,227 a U-shaped magnetic head is positioned against the walls of a T-shaped slot in a slider body using either an adhesive or the resiliency provided by elements used to mount a bridging core element or backbar between the legs of the head. The slider assembly of application, Ser. No. 794,322 includes a three-piece slider body, the different elements of which when assembled define a T-shaped recess and slot extending between the bottom of the recess and an air bearing surface of the resulting body. A U-shaped head is mounted within the slot using an adhesive, and the walls of the recess which may be machined to close tolerances before assembly of the three-piece body provide a supporting surface for the relatively fragile legs of the head.

The slider assemblies shown in applications, Ser. Nos. 750,227 and 794,322 work reasonably well for most if not all noncontact transducing applications. As use of assemblies of this type becomes more widespread however, and as the performance demands placed thereon increase, it may be desirable to provide various manufacturing and structural advantages not presently available. The ease of manufacture of such assemblies and the resulting cost thereof, for example, can be improved if the slider body is formed as a monolithic element with the magnetic head being added during formation of the body rather than subsequently. Heads which are mounted to the slider body using elastic devices or adhesives such as epoxy, moreover, undergo creep relative to the body through prolonged use and may eventually be damaged or destroyed as a result. Slider assemblies in which the head is chemically as well as physically bonded by the material of the slider body itself would therefore be advantageous from the standpoint of head life and transducing accuracy as well as manufacturing ease. The slider body should be of low porosity material to minimize material pickup and should be easy to lap and polish. Inspection of manufactured slider assemblies, measurement of the throat height of the nonmagnetic gap, and optical monitoring of the flying height are facilitated if the slider body is of transparent material having a known index of refraction rather than a material which is translucent or opaque. The manufacturing process should permit the formation of slider bodies of relatively complex shape where desirable.

BRIEF SUMMARY OF THE INVENTION

Air bearing slider assemblies in accordance with the invention include a magnetic head and monolithic body of substantially glass composition encompassing and in chemical bonding contact with the head. In one preferred embodiment the magnetic head is generally U-shaped and includes a pair of legs joined at their lower ends by a base. The head is disposed within the monolithic glass body such that the lower edge of the base which includes a nonmagnetic gap as defined by a glass spacer between butting surfaces of one leg and the base is generally continuous with a base or air bearing surface of the body. The base and the lower portions of the legs of the head extend between the base surface of the body and the bottom of a generally T-shaped recess extending into the body from a surface opposite the base surface thereof. The crossbar portion of the T-shaped recess defines a pair of walls which support the upper portions of the legs of the head and accommodates a core element or backbar and included coil to bridge the upper portions of the legs and complete a magnetic path to the gap. The backbar is held in contact with the legs of the head using elastomeric elements or other appropriate arrangements. The leg portion of the T-shaped recess which extends between the legs of the head and the supporting walls therefor is adapted to accommodate a plunging mechanism so that a proper air bearing can be maintained during use of the slider assembly.

Air bearing slider assemblies in accordance with the invention may be manufactured by use of a mold of appropriate configuration. In one preferred mold arrangement a central recess extends downwardly into the mold from an upper surface thereof to define the outer periphery of slider bodies to be formed. A portion of the mold extends upwardly from the bottom surface of the recess to provide the T-shaped recess in the slider body. The opposite legs of a U-shaped magnetic head are disposed within slots in the upwardly extending portion of the mold to position the head at a selected location relative to the slider body to be formed.

In one preferred method of fabricating air bearing slider assemblies in accordance with the invention, a U-shaped magnetic head which has had the opposite flat surfaces thereof machined to make them relatively smooth is positioned within a mold of the type described above, and the mold is heated to a selected temperature. The mold is then filled with a fluid glass composition to wet the legs and base of the head, and the glass composition becomes an undercooled liquid as it solidifies to form a monolithic body in chemically as well as physically bonded relation to the head. The glass body and head are removed from the mold and the glass is annealed. The slider assembly is then finished by grinding, lapping and polishing the base surface of the glass body and the included lower edge of the base of the head to provide an air bearing surface.

In an alternative method of fabrication the magnetic head is selectively positioned within the mold as before, and the mold is then filled with solid particles of glass. The glass particles are heated to a temperature sufficient to change the particles into a fluid glass composition which is then cooled to form the monolithic glass body in bonded relation to the head. In a further alternative method of fabrication at least a part of the body is preformed such as by hot pressing glass powder prior to its being heated to a fluid in a mold. The magnetic head is selectively positioned with the fluid glass and additional fluid glass is added as necessary prior to the solidification thereof as the monolithic glass body.

The ease of manufacture and the resulting cost of air bearing slider assemblies fabricated in accordance with the invention are greatly enhanced by the formation of the slider body as a monolithic element in contact with the magnetic head. The magnetic head is bonded chemically as well as physically by the material of the slider body itself, virtually eliminating creep and other undesirable problems present in many of the conventional head assemblies. The transparent glass slider body facilitates visual inspection of the manufactured slider assemblies, measurement of the throat height using the known index of refraction of the glass and monitoring of the flying height of the magnetic head during use by appropriate optical arrangements. The glass body moreover is relatively easy to lap and polish and presents an air bearing surface which is highly nonporous.

BRIEF DESCRIPTION OF THE DRAWINGS

A better understanding of the invention may be had by reference to the following description taken in conjunction with the accompanying drawings, in which.

DETAILED DESCRIPTION

Figure 1:
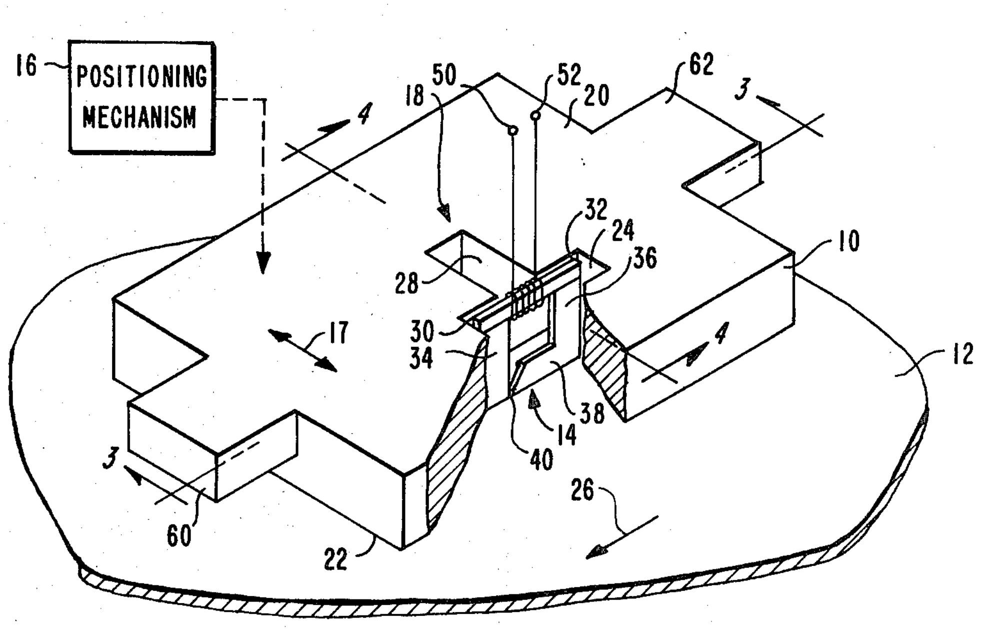
FIG. 1 is a perspective, partially broken away view of a magnetic head assembly in accordance with the invention.

A magnetic head assembly in accordance with the invention, referring to FIG. 1, includes an essentially monolithic carrier or vehicle body 10 which in the present example comprises an air bearing slider or shoe for disposition adjacent a magnetic recording surface 12. The slider body 10 supports one or more magnetic heads in precise spatial disposition relative to the magnetic recording surface 12, which is typically a high speed disk memory for a digital data processing system. Although only a single magnetic head 14 is shown for simplicity, it will be appreciated that multiple parallel heads or separate erase, record and reproduce heads, or various combinations thereof, can be employed. In one specific disk memory system in which the arrangement of FIG. 1 is utilized, however, each slider body 10 supports only a single magnetic head 14. A positioning mechanism 16 for moving the slider body 10 relative to the magnetic recording surface 12 as shown by an arrow 17 may comprise any well known arrangement, such as a slider carriage radially disposed relative to the disk, a movable arm rotatable about a pivot point, or any of numerous other available expedients now used in the art, if a movable head system is desired to be employed. The slider body 10, however, may also be used in a fixed head system.

In the practical example illustrated the slider body 10 is substantially rectangular in shape and is relatively small with overall dimensions of less than one-half inch on each side. The body 10 includes a T-shaped recess 18 extending downwardly from its upper surface 20 through a portion of the thickness between the surface 20 and a base or air bearing surface 22. The upper arm or crossbar portion 24 of the T-shaped recess 18 lies substantially parallel to the direction of relative movement between the slider body 10 and the magnetic recording surface 12 as shown by an arrow 26 in FIG. 1. A leg portion 28 of the T-shaped recess 18 extends between and adjacent a pair of walls 30 and 32 defined by the crossbar portion 24.

Figure 2:
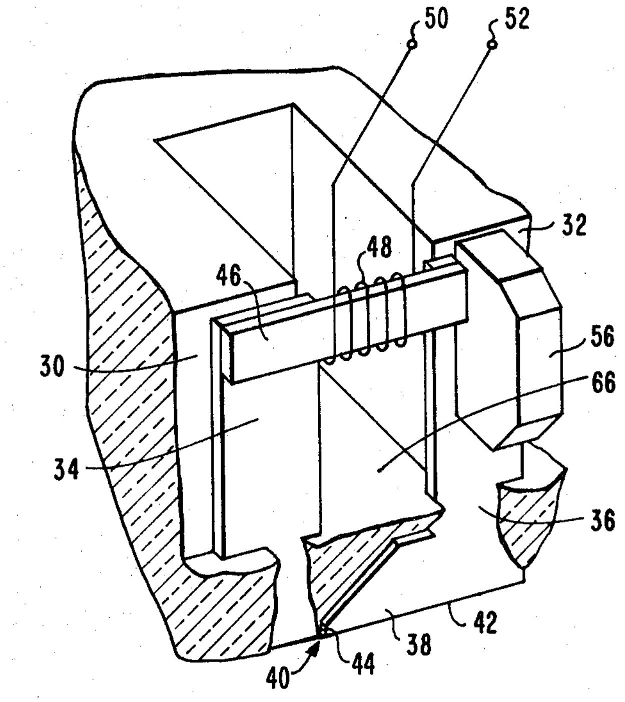
FIG. 2 is an enlarged fragmentary view of a portion of the arrangement of FIG. 1.

The specific disposition of the magnetic head 14 within the T-shaped recess 18 is best seen in the enlarged fragmentary view of FIG. 2. The body of the magnetic head 14 is generally U-shaped, having a pair of upstanding legs 34 and 36 and a base 38 joining the lower portions of the legs. The base 38 includes a nonmagnetic gap 40 which extends upwardly into the base from the lower edge 42 thereof and which comprises a nonmagnetic spacer 44, such as glass, disposed between butting surfaces of the leg 34 and the base 38. A core element or backbar 46 bridges the upper portions of the legs 34 and 36 to complete a magnetic path to the gap 40. The core 46 is encompassed by a coil 48, and terminals 50 and 52 from the coil 48 are coupled to associated circuitry (not shown). The core 46 is held in place against the legs 34 and 36 of the head by any appropriate means such as elastomeric clamps 54 and 56 of the type shown in the previously referred to application, Ser. No. 750,227. The clamps 54 and 56 have been omitted from FIG. 1 for clarity, and only the righthand clamp 56 is shown in FIG. 2 for similar reasons.

Figure 3:
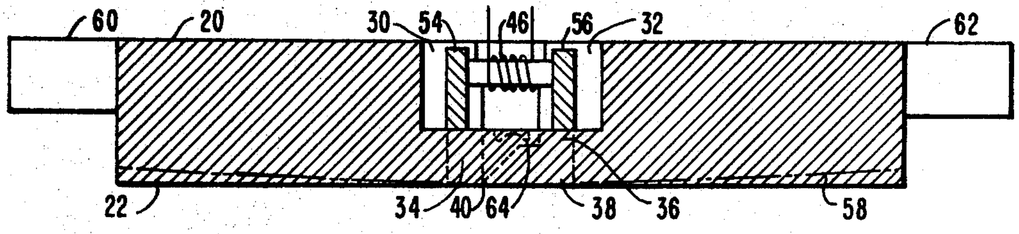
FIG. 3 is a front sectional view of the arrangement of FIG. 1 taken along the lines 3—3 thereof.
Figure 4:
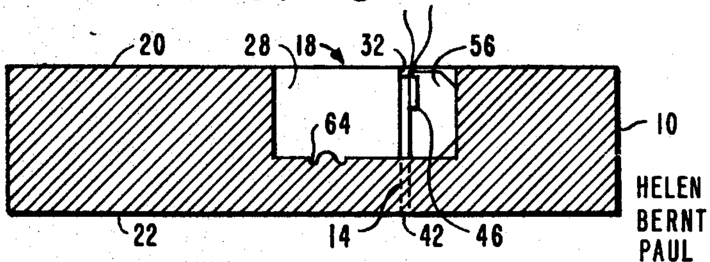
FIG. 4 is a side sectional view of the arrangement of FIG. 1 taken along the lines 4—4 thereof.

The base surface 22 of the slider body 10 may be either flat, or curved in concave fashion as shown by the dashed line 58 in FIG. 3, as desired, to provide an air bearing surface for the slider assembly. The slider body 10 is mounted on the positioning mechanism 16 by a pair of ears 60 and 62 which extend transversely from the slider body 10 and which may be plated with a metal and soldered to the positioning mechanism if desired. A recess 64 (shown in FIGS. 3 and 4) of circular configuration at the bottom surface of the leg portion 28 of the T-shaped recess 18 receives a probe device from the positioning mechanism 16 to facilitate dynamic control of the air bearing function of the slider assembly.

In accordance with the invention, the slider body 10 comprises a monolithic glass element formed in the glassy state and both adhering to the magnetic head 14 and partially encompassing and supporting the lower portion of the head 14. As described in detail hereafter the slider body 10 is formed by glass which wets the magnetic head 14 with fluid so as to be chemically as well as physically bonded thereto upon solidification as an undercooled liquid. The base 38 and the lower portions of the opposite legs 34 and 36 of the head 14 are embedded within the slider body 10 so as to extend between the base surface 22 and the bottom surface 66 of the T-shaped recess 18. The upper portions of the legs 34 and 36 reside against and are in chemical bonding contact with the walls 30 and 32 of the crossbar portion 24 of the T-shaped recess 18. The walls 30 and 32 provide flat supporting surfaces for the legs 34 and 36 preventing damage to the relatively fragile magnetic head, particularly during installation of the core element 46. In those slider assemblies in which the magnetic head is mounted to the slider body using an adhesive such as epoxy, or elastomeric devices, the bond between the head and the body is physical but not truly chemical. The head may therefore creep relative to the slider body during use, impairing the transducing accuracy of the assembly. If the head creeps in a downward direction relative to the slider body, contact between the head and the recording surface may eventually occur resulting in damage or destruction of the head. In slider assemblies according to the invention, however, the magnetic head 14 is maintained in a fixed position relative to the slider body 10 because of the chemical as well as physical bonding of the head provided by the monolithic glass slider body 10.

Figure 5:
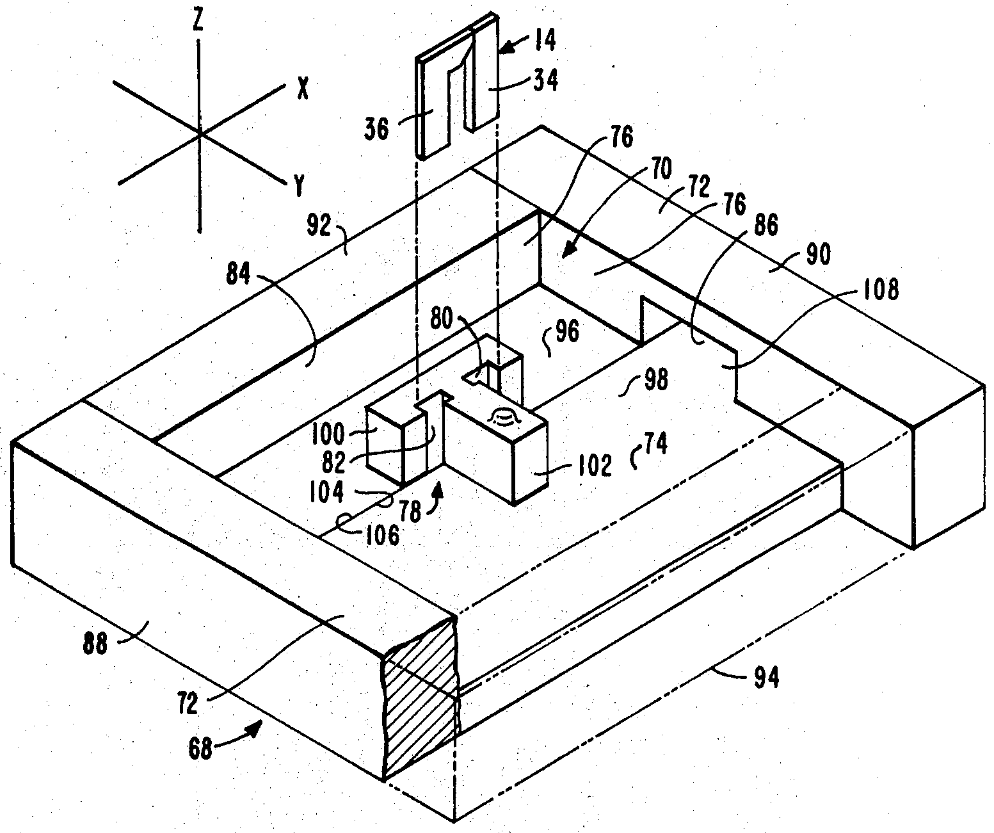
FIG. 5 is a perspective, partially broken away view of a mold for use in the fabrication of magnetic head assemblies in accordance with the invention.

One preferred form of a mold assembly 68 for use in the fabrication of air bearing slider assemblies in accordance with the invention is illustrated in FIG. 5. The mold assembly 68 has a central cavity or recess 70 extending downwardly from a relatively flat upper surface 72 and having a bottom wall or surface 74 and sidewalls 76 which extend between the bottom wall 74 and the upper surface 72. The mold assembly 68 includes a raised portion 78 extending upwardly from the central region of the bottom wall 74 and providing a pair of spaced-apart slots 80 and 82 for receiving the opposite legs 34 and 36 of a magnetic head 14.

The raised portion 78 and its included slots 80 and 82 provide for three dimensional positioning of the head 14. As shown in FIG. 5 the slots 80 and 82 position the head 14 in both X and Y directions relative to the slider body to be formed. The positioning of the head 14 in the X direction centers the head relative to the body, while the positioning of the head in the Y direction disposes the head a selected distance from a reference surface 84 as defined by one of the sidewalls of the recess 70 to facilitate the proper positioning of the head for operation when the completed slider assembly is installed within the mounting assembly. Positioning of the head 14 in the vertical or Z direction and relative to the air bearing surface of the slider body 10 to be formed is provided by the top surface of the raised portion 78 which engages the base of the head as the legs 34 and 36 are moved downwardly into the slots 80 and 82.

When the recess 70 of the mold assembly 68 is filled with a fluid glass composition the various sidewalls 76 of the mold define the side surfaces of the slider body 10 to be formed thereby. The bottom wall 74 of the mold defines the upper surface 20 of the slider body 10 and the upper surface 72 of the mold defines the plane of the base surface 22 of the slider body. Recesses 86 (only one of which is shown in FIG. 5) in an opposing pair of the sidewalls 76 define the shapes of the ears 60 and 62 of the slider body while the raised portion 78 defines the T-shaped recess 18 to be formed therein. Positioning of the magnetic head 14 at a selected location relative to the reference surface 84 of the mold provides for uniformity in the formed slider assemblies. Extensive recalibration of the positioning mechanism 16 to adjust for variations in the location of the nonmagnetic gap 40 relative to the positioning mechanism carriage are thereby avoided, if when the slider assembly is being mounted the outer side surface thereof formed by the reference surface 84 of the mold is correctly located.

The mold assembly 68 comprises a number of different parts which may be disassembled upon formation of the slider body to permit removal thereof and reassembled in preparation for the formation of the next slider body. As shown, the mold assembly 68 includes an upper portion thereof comprising four elongated side members 88, 90, 92 and 94 and a lower portion thereof comprising two relatively flat bottom members 96 and 98. The four side members 88, 90, 92 and 94 when assembled have upper surfaces which define the upper surface 72 of the mold and a central aperture which defines the sidewalls 76 of the mold. The bottom member 96 has an upper surface which defines a portion of the bottom wall 74 and an upwardly extending portion 100 which defines the slots 80 and 82 as well as the shape of the crossarm portion 24 of the T-shaped recess 18 of the slider body 10. The bottom member 98 has an upper surface defining the remainder of the bottom wall 74 and an upwardly extending portion 102 thereof which defines the shape of the leg portion 28 of the T-shaped recess 18 and the circular recess 64 to be formed at the bottom thereof. The upwardly extending portion 102 resides against the opposite legs 34 and 36 of the magnetic head 14 to hold the head in place whenever the respective edges 104 and 106 of the members 96 and 98 are joined together to form the lower portion of the mold assembly. The bottom member 98 includes opposite outwardly extending tabs 108 (only one of which is shown in FIG. 5) which define the top surfaces of the ears 60 and 62 of the slider body 10.

Figure 6:
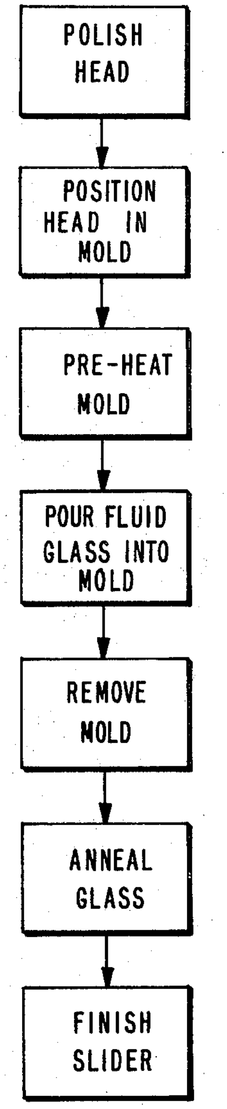
FIG. 6 is a block diagram of successive steps employed in one method of fabricating magnetic head assemblies in accordance with the invention.
Figure 7:
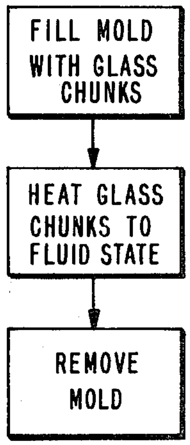
FIG. 7 is a block diagram of successive steps employed in an alternative method of fabricating magnetic head assemblies in accordance with the invention.

The successive steps of one preferred method of fabricating air bearing slider assemblies in accordance with the invention are shown in block diagram form in FIG. 6. The method of FIG. 6 and the alternative method of FIG. 7 are described in connection with the particular mold assembly 68 shown in FIG. 5, but can be performed using molds of other appropriate configuration. Fabrication of a slider assembly in accordance with the method of FIG. 6 is begun by polishing the relatively flat opposite broad surfaces of the magnetic head 14 to remove surface indentations and other irregularities while at the same time making the surfaces as smooth as possible. The head 14 is then positioned within the mold by placing the opposite legs 34 and 36 thereof within the slots 80 and 82. The bottom member 98 of the mold assembly is then placed in the assembled position with the edge 106 thereof abutting the edge 104 of the bottom member 96 to hold the head in place. The side members 88, 90, 92 and 94 are placed in the positions shown in FIG. 5 to complete assembly of the mold. The mold 68 is preheated to a selected temperature in the range of annealing temperatures for glass to be used, and a glass composition which has been heated to a level sufficient to render it fluid is poured into the recess 70 of the mold so as to wet the magnetic head 14. Depending on the fluidity of the glass it may be desirable in some instances to force the glass into the various mold cavities using a plunging die or other appropriate arrangement. The glass composition is allowed to cool to the extent necessary for solidification prior to the removal of the mold assembly 68 therefrom. The glass body is thereafter perfected by further treatment such as annealing, and is then ground, lapped, polished, etched or fire polished as appropriate to finish the assembly and to provide a smooth air bearing surface which is either flat or curved as desired.

It is important that the glass wet the magnetic head while fluid to achieve a good chemical bond. The wettability of the glass is a function of both its surface energy and its viscosity, most common glasses having a surface energy on the order of 200 to 350 dynes per centimeter with a working viscosity on the order of $10^3$ to $10^4$ poises. Glasses having a surface energy and viscosity within these ranges have been found to work reasonably well, particularly where the opposite flat surfaces of the magnetic head are polished to a smooth finish. In addition to providing the magnetic head with desired thickness, the polishing thereof also enhances the chemical bond with the glass and prevents the formation of bubbles at the interface of the head and glass. The polishing of the head may be extended to include the edges or opposite narrow surfaces thereof where bubble formation is to be virtually eliminated.

Preheating the mold prior to the pouring of the fluid glass composition therein is not essential but is highly desirable in most cases. Preheating of the mold moreover may take place prior to the positioning of the head therein if preferred. A mold which is preheated to a temperature such as 400° C. within the general range of annealing temperatures for the glass minimizes thermal shock upon contact with the fluid glass and prevents the dissipation of heat from the glass at an undesirably rapid rate.

Slider assemblies in which the magnetic head is mounted, for example, to a ceramic slider body using an adhesive such as glass involve extensive thermal problems, particularly in the fabrication thereof, because of the often widely differing thermal coefficients of expansion of the head-adhesive-body combination. In slider assemblies fabricated in accordance with the invention, however, such thermal problems are greatly minimized due to the elimination of the adhesive and the general thermal compatibility of most glasses with the materials typically used for the magnetic head. Careful matching of the thermal properties of the glass and the ferrite material of the head provides a "quality seal" which is highly reliable. Most glasses having a temperature coefficient of expansion on the order of $80–110 \times 10^{-7}/°$ C., for example, work well. Magnetic heads made of ferrite material typically have a temperature coefficient on the order of $90 \times 10^{-7}/°$ C. Thus if a ferrite head is used, many common glasses can be used without encountering significant thermal problems. It may be desirable for some applications however to choose a glass having a temperature coefficient relatively close to that of the magnetic head material.

The magnetic head 14 is preferably of ferrite material, particularly where high frequency transducing is to be used. Where lower frequencies are involved, heads of nonferrite material such as Permalloy can also be used. Thin film heads such as those sputtered on a substrate or formed by vacuum deposition or similar techniques can moreover be used in accordance with the invention.

The glass used for the slider body should be relatively moisture resistant, and should have a reasonably low working temperature, especially if used with a high temperature glass spacer 44 in the nonmagnetic gap 40 of the head 14. Glasses which become fluid at a temperature on the order of 650° C. or less will generally not disturb the nonmagnetic gap. It has been found in this connection that where the thermal characteristics of the glasses are to be closely matched with those of the head, a variety of different glasses are available which share a commonly low working temperature, yet have widely differing coefficients of thermal expansion. Among such glasses are those such as 7570 glass sold by Corning Glass Works which have a relatively high lead content.

Ferrite magnetic heads 14 often have a gap depth or throat height on the order of 35 mils. The upper surface of the upwardly extending portion 100 of the mold assembly 68 shown in FIG. 5 positions the head such that about 32 or 33 mils of the gap depth protrude from the base surface of the slider body formed thereby. During the finishing process this protruding portion of the head is ground off so that the lower edge 42 of the base 38 of the head becomes flush with or continuous with the base surface 22. The base surface is then lapped and polished to provide the desired smoothness and to provide a gap depth or throat height on the order of 1 mil or less.

The successive steps of an alternative method of fabrication of slider assemblies in accordance with the invention are illustrated in greatly simplified form in FIG. 7. As in the method of FIG. 6, the magnetic head is preferably polished to smooth its surfaces, and is positioned within the mold. The mold is then filled with a cullet or frit comprising chunks of glass, and the glass is heated to a temperature sufficient to form a fluid glass composition. The fluid glass composition wets the head so as to be chemically as well as physically bonded thereto as the composition cools and solidifies to form the slider body. The mold is then removed and the formed slider assembly may be annealed and finished as in the method of FIG. 6. The glass bodies formed by this method may be somewhat porous unless relatively high temperatures are used during their formation. In cases where the porosity of the air bearing surface is objectionable, such porosity may be eliminated by an appropriate technique such as hot pressing.

It will be appreciated that methods of fabrication in accordance with the invention using an appropriate mold arrangement such as that shown in FIG. 5 are relatively simple and lend themselves readily to an automated manufacturing process for the mass production of slider assemblies at a relatively low cost per unit. An important feature of the methods of fabrication is the bonding of the magnetic head to the slider body simultaneously with the formation of the body rather than at a later time. A further important feature is the formation of the slider body as a monolithic or integral element rather than from a plurality of preformed parts thereof.

Figure 8:
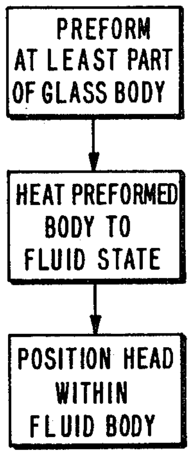
FIG. 8 is a block diagram of successive steps employed in a further alternative method of fabricating magnetic head assemblies in accordance with the invention.

The method of fabrication discussed thus far involve the formation of the glass body as a complete and integral unit in contact with the head. As shown in FIG. 8 however, the head may be added to the body after it is partially or completely preformed. Preformed bodies may be fabricated from cast or as-cast pieces of glass having a low porosity. Alternatively the preformed bodies may be fabricated by sintering glass particles or hot pressing glass powder, although the resulting porosity may require fire-polishing after formation of the air bearing surface.

The preformed body portion may be placed within a mold of the type shown in FIG. 5. The body portion is then heated to a fluid mass and the head is positioned therein prior to the addition of fluid glass to the mold as appropriate to complete the slider body. Alternatively the body portion may be formed from a rigid high temperature glass with the head then being sealed in place using a lower temperature fluid glass.

The mold may be made of any appropriate material which is not readily wet by the glass, which does not dissipate heat from the glass at an excessive rate, and which is reasonably wear resistant. Even though the mold is preheated to the annealing temperature of the glass, the mold is never hotter than the glass and is therefore not easily wet by the glass. Where the manufacturing process is not an automated one and the mold is therefore not subject to much abuse, boron nitride or graphite may be used as the mold material. Boron nitride, while expensive and generally subject to thermal shock, provides excellent resistance to wetting and excessive heat dissipation. Graphite is considerably less expensive but requires a closely controlled environment to prevent oxidation thereof. Where the manufacturing process is automated and the mold is subject to continued wear, more durable materials such as steel and aluminum are preferred. Stainless steel performs well in most such applications. Aluminum is also satisfactory for many such applications but may not be desirable for some because of the relatively rapid rate at which it dissipates heat from the glass.

The glass bodies of slider assemblies according to the invention provide a number of additional advantages over those assemblies in which the body is made of a translucent or opaque material such as a ceramic. The transparency of a glass body permits the flying height of the assembly to be monitored by optical devices during use thereof. During fabrication of the assemblies the transparent glass body permits visual or optical inspection of the assemblies as well as measurement of the throat height of the magnetic head using the index of refraction of the glass. Ceramics are typically very hard and are therefore difficult to lap and polish during the finishing process. Glass slider bodies are softer and therefore much easier to finish. After finishing, the glass bodies can be coated with a thin layer of an appropriate substance such as a ceramic, chromium, silicon carbide or any of various oxides where greater resistance to wear is desired. The air bearing surface presented by glass bodies has a very low porosity which virtually eliminates problems of material pickup. The properties of glass are moreover such that the bending stress, deflection and spacing loss which results therefrom in slider assemblies constructed in accordance with the invention have been found to be no worse than assemblies having a ceramic body.

While the invention has been particularly shown and described with reference to a preferred embodiment thereof, it will be understood by those skilled in the art that various changes in form and details may be made therein without departing from the spirit and scope of the invention. For example, the slider could be formed from a glass in the fluid state and subsequently heat treated to be crystallized in the rigid state. Also, the magnetic head may be injected from a top or overhead mold portion into a mold cavity filled with glass, with a two piece mold in an automated process.

What is claimed is:

1. An air bearing magnetic head assembly comprising:
at least one magnetic head; and
a monolithic transparent glass slider body, chemically bonded to at least one surface of the head by forming the body in a glassy state in contact with the magnetic head, and the body together with the head providing an integral structure in which the head is held by the body in fixed relation thereto.

2. A magnetic head assembly in accordance with claim 1, wherein the glass of the monolithic body is of a type which becomes fluid at a temperature less than 650° C. and which has a surface energy within the range of 200–350 dynes centimeter and viscosity within the range of $10^3$–$10^4$ poises enabling the glass to readily wet the magnetic head when fluid.

3. An air bearing magnetic head assembly comprising:
at least one generally U-shaped magnetic head having a pair of leg portions joined by a base portion, said base portion including a nonmagnetic gap; and
a monolithic transparent slider body of substantially glass composition encompassing and chemically bonded to said head by forming the body in a glassy state in contact with the magnetic head, said body having a base surface substantially continuous with the base portion of the head.

4. A magnetic head assembly in accordance with claim 3, wherein the head is substantially of ferrite material.

5. A magnetic head assembly in accordance with claim 3, wherein the body includes a pair of head supporting surfaces, and each leg portion of the head is in chemical bonding contact with a different one of the head supporting surfaces.

6. A magnetic head assembly in accordance with claim 3, wherein the glass of the monolithic body is moisture resistant, becomes fluid at a temperature less than 650° C., and has a surface energy within the range of 200–350 dynes/centimeter and a viscosity within the range of $10^3$–$10^4$ poises.

* * * * *